United States Patent
Mo (10) Patent No.: US 8,437,710 B2
(45) Date of Patent: *May 7, 2013

(54) WIRELESS TRANSMISSION APPARATUS (75) Inventor: Chia-Ping Mo, Taipei (TW)

(73) Assignee: Ajoho Enterprise Co., Ltd., Taipei (TW)

(*) Notice: Subject to any disclaimer, the term of this patent is extended or adjusted under 35 U.S.C. 154(b) by 110 days.

This patent is subject to a terminal disclaimer.

(21) Appl. No.: 13/116,701

(22) Filed: May 26, 2011

(65) Prior Publication Data

US 2012/0108190 A1    May 3, 2012

(30) Foreign Application Priority Data

Nov. 2, 2010 (TW) .............................. 99221175 U (51) Int. Cl.
 *H04B 1/02* (2006.01)
 *H04B 1/034* (2006.01)
(52) U.S. Cl.
 USPC ........................................... 455/91; 455/128
(58) Field of Classification Search .............. 455/90.1, 455/90.3, 66.1, 91, 128; 439/620.01, 620.15, 439/620.18, 620.19
 See application file for complete search history.

(56) References Cited

U.S. PATENT DOCUMENTS

| | | | |
|---|---|---|---|
| 6,219,732 B1 * | 4/2001 | Henrie et al. | 710/301 |
| 6,516,202 B1 * | 2/2003 | Hawkins et al. | 455/556.2 |
| 6,776,651 B1 * | 8/2004 | Liu | 439/490 |
| 7,074,061 B1 * | 7/2006 | Roth et al. | 439/131 |
| 7,343,439 B2 * | 3/2008 | Mills et al. | 710/301 |
| 7,359,208 B2 * | 4/2008 | Ni | 361/752 |
| 7,588,445 B2 * | 9/2009 | He et al. | 439/79 |
| 7,713,091 B2 * | 5/2010 | Chen | 439/630 |
| 7,874,874 B2 * | 1/2011 | Chang | 439/620.01 |
| 7,905,750 B2 * | 3/2011 | Mo | 439/541.5 |
| 7,914,324 B2 * | 3/2011 | Pepe et al. | 439/540.1 |
| 2010/0159748 A1 * | 6/2010 | Chang | 439/620.22 |
| 2012/0051024 A1 * | 3/2012 | Mo | 361/814 |

* cited by examiner

*Primary Examiner* — Lewis West (74) *Attorney, Agent, or Firm* — Muncy, Geissler, Olds & Lowe, PLCC (57) ABSTRACT

A wireless transmission apparatus includes an electrically insulative housing, metal conducting terminals vertically arranged at the rear side of the electrically insulative housing and having one respective front contact portion respectively horizontally extended to the bottom wall of an accommodation chamber in the electrically insulative housing, and a transmission module, which includes a circuit assembly accommodated in the accommodation chamber of the electrically insulative housing and metal adapter terminals each having a bonding end vertically disposed at the rear side and respectively bonded to the circuit assembly and a springy contact end horizontally disposed at the front side and kept in positive contact with the front contact portion of one respective metal conducting terminal.

12 Claims, 8 Drawing Sheets

WIRELESS TRANSMISSION APPARATUS

This application claims the priority benefit of Taiwan patent application number 099221175, filed on Nov. 2, 2010.

BACKGROUND OF THE INVENTION

1. Field of the Invention

The present invention relates to wireless transmission technology and more particularly, to a wireless transmission apparatus, which has angled metal conducting terminals arranged in an electrically insulative housing for the transmission of a wired signal, a transmission module arranged in the top side of the electrically insulative housing for the transmission of a wireless signal, and angled metal adapter terminals arranged at the rear side of the transmission module and respectively electrically kept in contact with the angled metal conducting terminals.

2. Description of the Related Art

Following fast development of technology, wireless network technology, many different sophisticated and advanced high-tech electrical and electronic products are created for different applications. Unlike the conventional mechanical touch control, these advanced high-tech electrical and electronic products, such as digital TV, audio player, video player, MOD, multimedia player, intelligent air-conditioner, intelligent refrigerator, computer, mobile telephone, notebook computer and etc., are controllable to run by means of a wireless controller that may be configured subject to Radio frequency, infrared, Bluetooth protocol. Further, these advanced high-tech electrical and electronic products may be electrically connected to a peripheral equipment through a USB, mini USB, SATA, eSTAT or RJ type interface means to expand the function. For example, a TV may be electrically connected with a multimedia player, a MOD, a speaker system, a computer, and/or a digital camera through a connection interface for signal transmission or data storage. A computer may be electrically connected with a keyboard, a mouse, a printer, a TV receiver, a modem and/or any of a variety of peripheral apparatus to expand the function. For the connection of peripheral apparatuses to enhance or expand the function, an electronic device must be equipped with suitable connection interface means.

Further, signal transmission between electrical or electronic products can be done by a wired or wireless method by means of a set of male and female electric connectors or a wireless transmitter and receiver system. In actual practice, some problems, as stated below, may be encountered:

1. The internal circuit board of the electrical or electronic product must be equipped with multiple electric connectors or signal transmission devices for communication with multiple peripheral apparatuses. These electric connectors or signal transmission devices occupy much surface space of the internal circuit board of the electrical or electronic product and may interfere with the circuit layout of the circuit board.
2. For enabling an electrical or electronic product to transmit and receive a wireless signal, a transmitting/receiving antenna or a wireless transmitter and receiver system must be attached and used with a mating wireless signal processing circuit or adapter means. The installation of these extra components requires much installation space and may interfere with the circuit layout of the original circuit board of the electrical or electronic product.

Therefore, it is desirable to provide a wireless transmission apparatus for electrical or electronic product that eliminates the aforesaid problems.

SUMMARY OF THE INVENTION

The present invention has been accomplished under the circumstances in view. It is one object of the present invention to provide a wireless transmission apparatus, which can be installed in an electrical or electronic product for enabling the electrical or electronic product to transmit a wired signal as well as a wireless signal without interfering with the circuit layout of the internal circuit board of the electrical or electronic product.

To achieve this and other objects of the present invention, a wireless transmission apparatus comprises an electrically insulative housing defining therein an accommodation chamber, a plurality of metal conducting terminals vertically arranged at the rear side of the electrically insulative housing and horizontally extending to the inside of the electrically insulative housing and rested on the bottom wall of the accommodation chamber for the transmission of a wired signal, a transmission module, which comprises a circuit assembly accommodated in the accommodation chamber of the electrically insulative housing for the transmission of a wireless signal and a plurality of metal adapter terminals electrically bonded to a bonding unit at the rear side of the circuit assembly and respectively terminating in a curved springy contact end respectively electrically kept in contact with the front contact portion of each of the metal conducting terminal.

Further, the accommodation chamber of the electrically insulative housing is a substantially U-shaped open chamber so that the circuit assembly of the transmission module can be inserted into the accommodation chamber vertically from the top side of the electrically insulative housing or horizontally from the front side of the electrically insulative housing. Further, the transmission module comprises a plurality of locating grooves symmetrically disposed at two opposite lateral sides thereof and respectively forced into engagement with respective retaining blocks of the electrically insulative housing.

Further, the transmission module is configured subject to Bluetooth technology or Wi-Fi technology, comprising a box defining therein a receiving chamber, which accommodates the circuit assembly. The box of the transmission module comprises a box body and a box cover covering the box body. The box body comprises a plurality of through holes cut through opposing top and bottom walls of for the passing of the metal conducting terminals. The circuit assembly comprises a plurality of via holes. Each metal adapter terminal comprises a bonding end disposed at one end thereof and bonded to one of the via hole of the circuit assembly. The curved springy contact end of each metal adapter terminal extends in a direction perpendicular to the associating bonding end.

DETAILED DESCRIPTION OF THE PREFERRED EMBODIMENT

Figure 1:
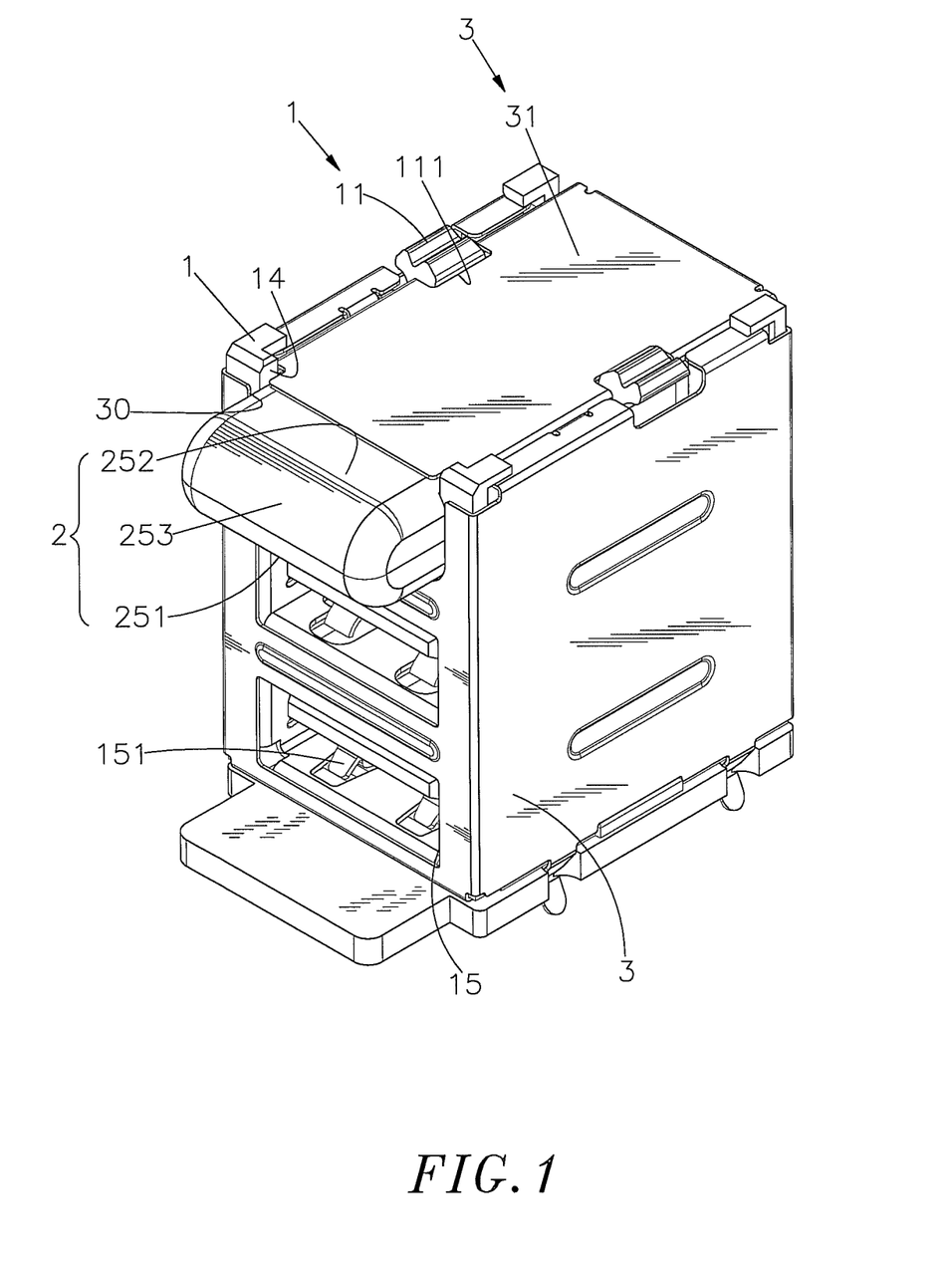
FIG. 1 is an elevational view of a wireless transmission apparatus in accordance with the present invention.
Figure 2:
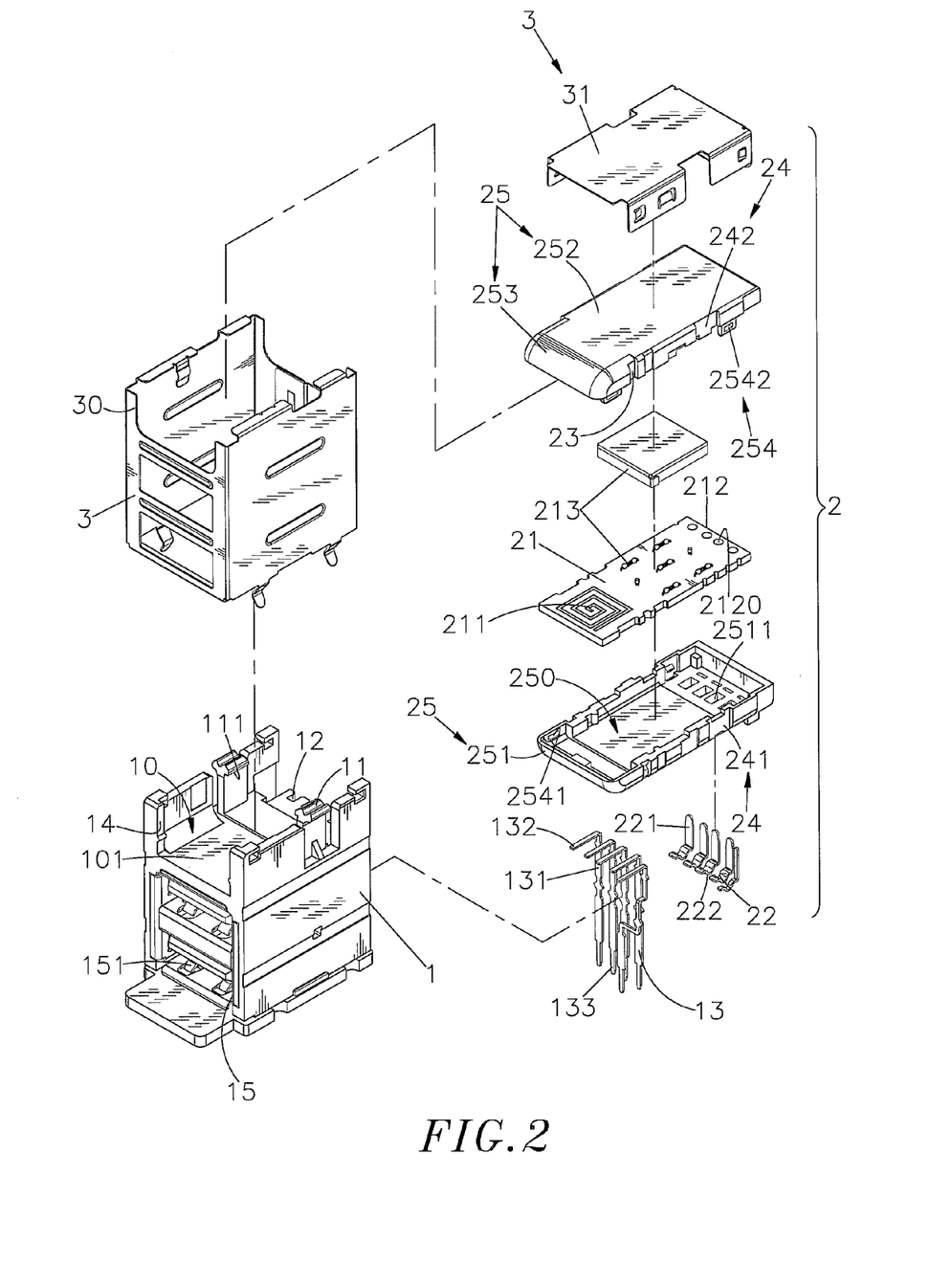
FIG. 2 is an exploded view of the wireless transmission apparatus in accordance with the present invention.
Figure 3:
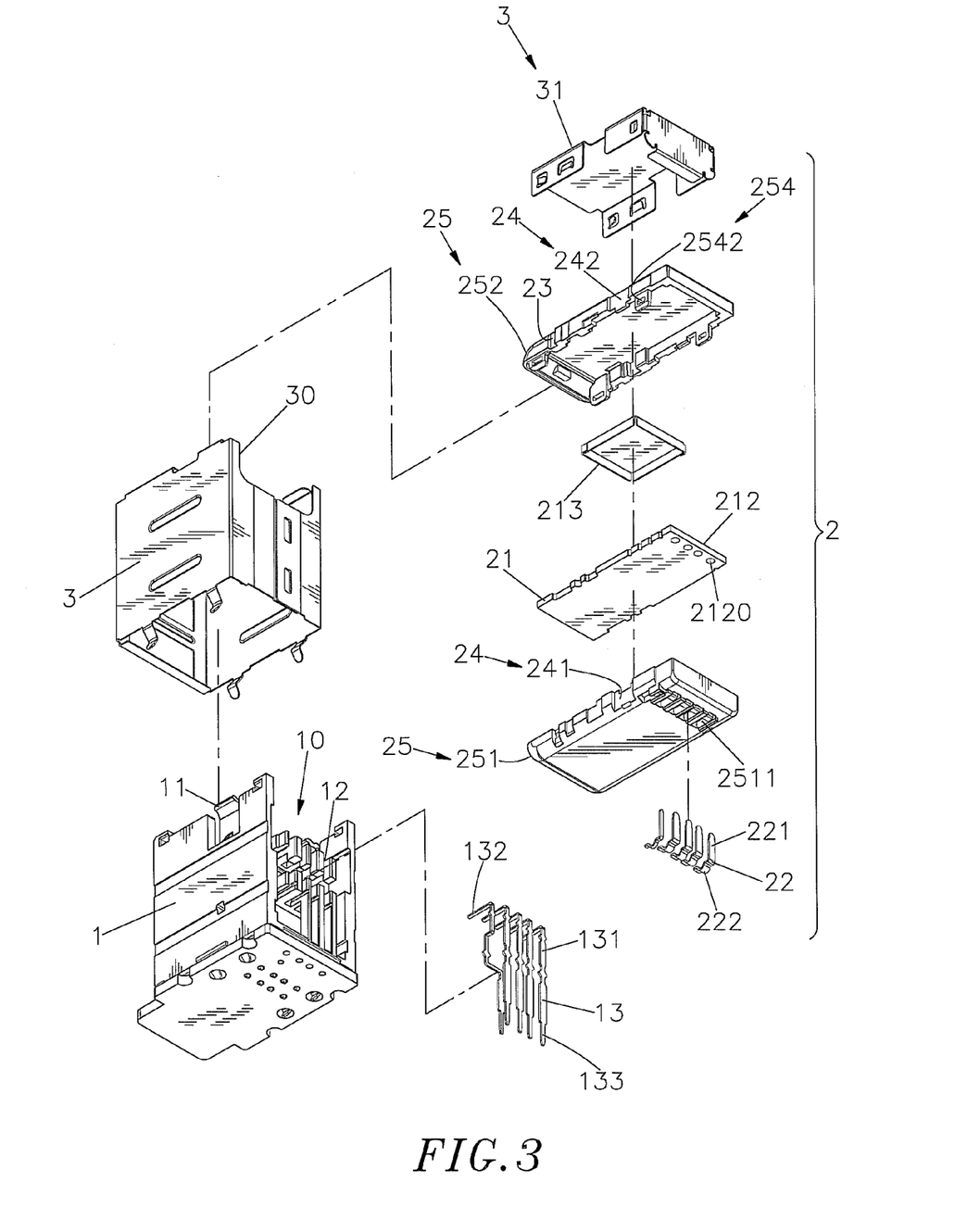
FIG. 3 corresponds to FIG. 2 when viewed from another angle.
Figure 4:
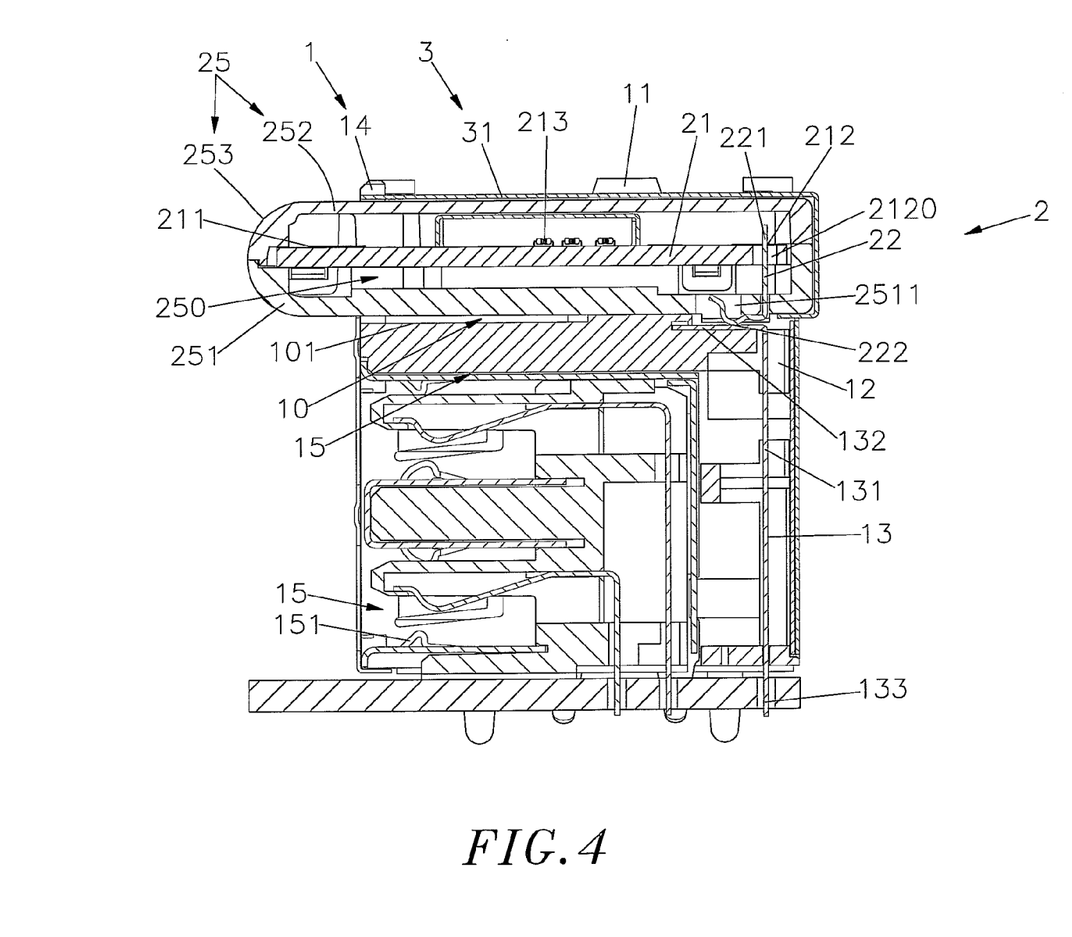
FIG. 4 is a sectional view of the wireless transmission apparatus in accordance with the present invention.

Referring to FIGS. 1~4, a wireless transmission apparatus in accordance with the present invention is shown comprising an electrically insulative housing 1, a plurality of metal conducting terminals 13, and a transmission module 2.

The electrically insulative housing 1 comprises an accommodation chamber 10 that is a substantially U-shaped open chamber, a plurality of springy retaining arms 11 symmetrically disposed at two opposite lateral sides of the accommodation chamber 10 and respectively terminating in a top hooked portion 111, a plurality of terminal grooves 12 vertically arranged at a rear side thereof in a parallel manner and extending perpendicular to the bottom wall 101 of the accommodation chamber 10 for the positioning of the metal conducting terminals 13, and two retaining blocks 14 bilaterally and vertically disposed at the front side of the bottom wall 101 of the accommodation chamber 10 remote from the terminal grooves 12.

The metal conducting terminals 13 are arranged at the rear side of the electrically insulative housing 1 in a parallel manner and extending vertically downwardly in a perpendicular manner relative to the bottom wall 101 of the accommodation chamber 10, Each metal conducting terminal 13 comprises a base portion 131 positioned in one respective terminal groove 12, a front contact portion 132 extended from one end of the base portion 131 and rested on the bottom wall 101 of the accommodation chamber 10, and a rear bonding portion 133 extended from the other end of the base portion 131 and suspending outside the terminal grooves 12 for bonding.

The transmission module 2 comprises a circuit assembly 21 that comprises a signal transmission unit 211 disposed at one end thereof and adapted for receiving a wireless signal, a bonding unit 212 disposed at an opposite end thereof and a signal processing unit 213 electrically connected between the signal transmission unit 211 and the bonding unit 212, a plurality of metal adapter terminals 22 each having a bonding end 221 extended from one end thereof and respectively bonded to the bonding unit 212 and a springy contact end 222 curved from an opposite end thereof, a plurality of locating grooves 23 symmetrically disposed at two opposite lateral sides relative to the signal transmission unit 211 and a plurality of retaining grooves 24 symmetrically disposed at two opposite lateral sides relative to the bonding unit 212.

During installation, insert the transmission module 2 into the accommodation chamber 10 either vertically from the top side of the electrically insulative housing 1 or horizontally from the front side of the electrically insulative housing 1 to force the springy contact ends 222 of the metal adapter terminals 22 of the transmission module 2 into contact with the front contact portions 132 of the metal conducting terminals 13 at the bottom wall 101 of the accommodation chamber 10 and to simultaneously force the retaining grooves 24 of the transmission module 2 into engagement with the springy retaining arms 11 of the electrically insulative housing 1 and the locating grooves 23 of the transmission module 2 into engagement with the respective retaining blocks 14 of the electrically insulative housing 1. Thus, the electrically insulative housing 1 and the transmission module 2 are assembled together.

As stated above, the base portions 131 of the metal conducting terminals 13 are respectively mounted in the terminal grooves 12 of the electrically insulative housing 1. The front contact portions 132 are respectively extended from the respective base portions 131 at right angles and then kept in horizontal at the bottom wall 101 of the accommodation chamber 10. The electrically insulative housing 1 further comprises at least one, for example, two receiving holes 15 disposed at different elevations below the accommodation chamber 10. An electrical connector 151 is mounted in each receiving hole 15. The electrical connector 151 can be a USB (Universal Serial Bus) connector, SATA (Serial Advanced Technology Attachment) connector, eSATA (External Serial Advanced Technology Attachment) connector, RJ-45 connector or HDMI (High-definition Multimedia Interface) connector. Further, the electrically insulative housing 1 is surrounded by a metal shield 3 for EMI (electromagnetic interference) protection. The metal shield 3 consists of a substantially U-shaped body shielding shell 30 and a cover shielding shell 31.

Further, the aforesaid transmission module 2 can be a Bluetooth or Wi-Fi module for the transmission of a wireless signal. The transmission module 2 further comprises a box 25 that holds the circuit assembly 21 on the inside. The box 25 comprises a box body 251 and a box cover 252. The box body 251 and the box cover 252 are attached together, defining therein a receiving chamber 250 that accommodates the circuit assembly 21. Further, a signal transmitting and receiving member 253 is arranged at the front side of the box 25. Further, the locating grooves 23 of the transmission module 2 are located on two opposite lateral sides of the box 25 adjacent to the signal transmitting and receiving member 253. Further, each retaining groove 24 of the transmission module 2 comprises an upper part 241 located on one lateral side of the box body 251 and a lower part 242 located on the corresponding lateral side of the box cover 252. Further, mating fastening members 254 are provided at the box body 251 and the box cover 252 for joining them together. The mating fastening members 254 include male fastening members, for example, retaining blocks 2541 located on the box body 251, and female fastening members, for example, retaining eye lugs 2542 located on the box cover 252 for engagement with the respective retaining blocks 2541.

Further, the bonding unit 212 of the circuit assembly 21 of the transmission module 2 comprises a plurality of via holes 2120 for the bonding of the bonding ends 221 of the metal adapter terminals 22. Alternatively, the bonding unit 212 of the circuit assembly 21 can be formed of a set of flat contacts installed in the circuit assembly 21 in a flush manner for the bonding ends 221 of the metal adapter terminals 22 by surface mount technology. Further, the box body 251 comprises a plurality of through holes 2511 cut through the opposing top and bottom walls thereof for the passing of the metal adapter terminals 22. The curved springy contact ends 222 of the metal adapter terminals 22 are respectively vertically extended out of the respective through holes 2511 and then turned through about 90° angle and suspending at the bottom side of the box body 251.

Figure 5:
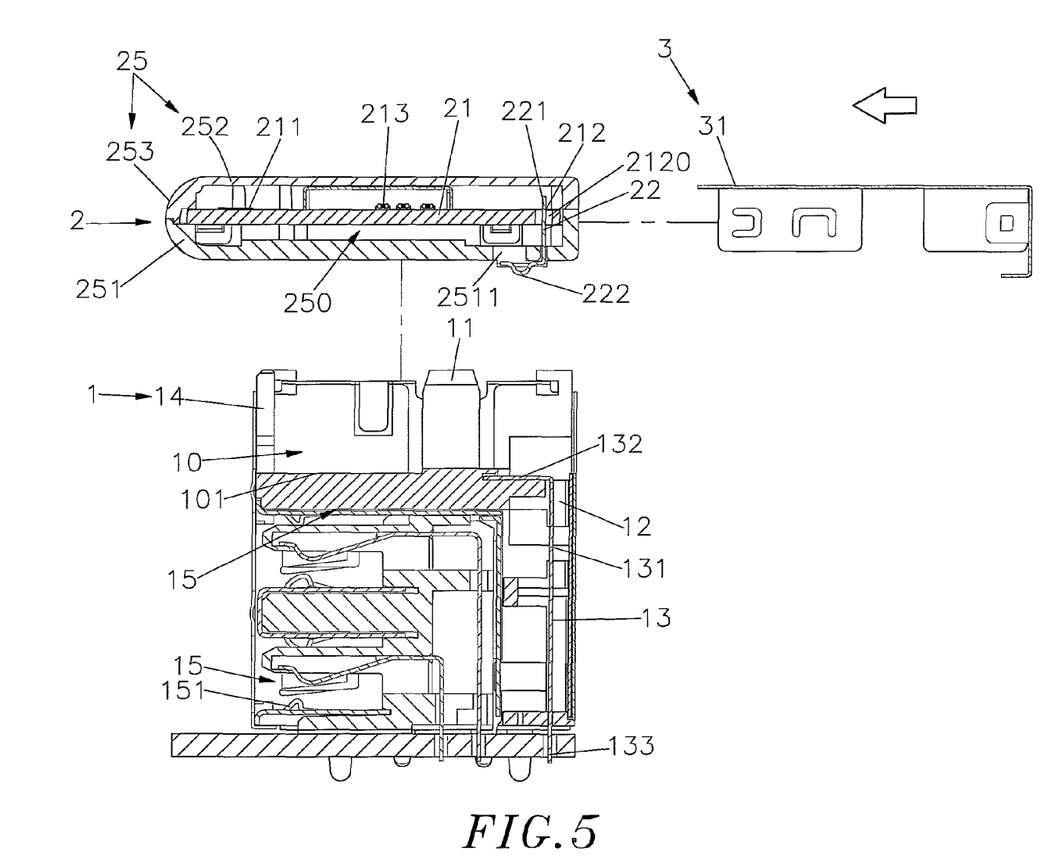
FIG. 5 is a schematic sectional exploded view of the present invention, illustrating a status of the assembly process of the wireless transmission apparatus.
Figure 6:
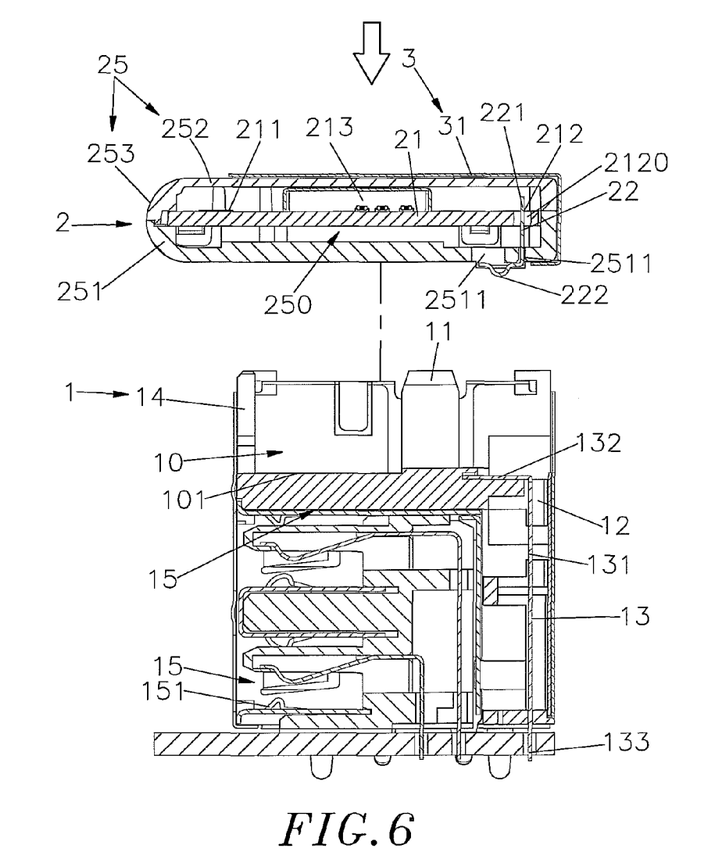
FIG. 6 is a schematic sectional installation view of the present invention, illustrating installation of the transmission module in the accommodation chamber of the electrically insulative housing in a vertical direction.
Figure 7:
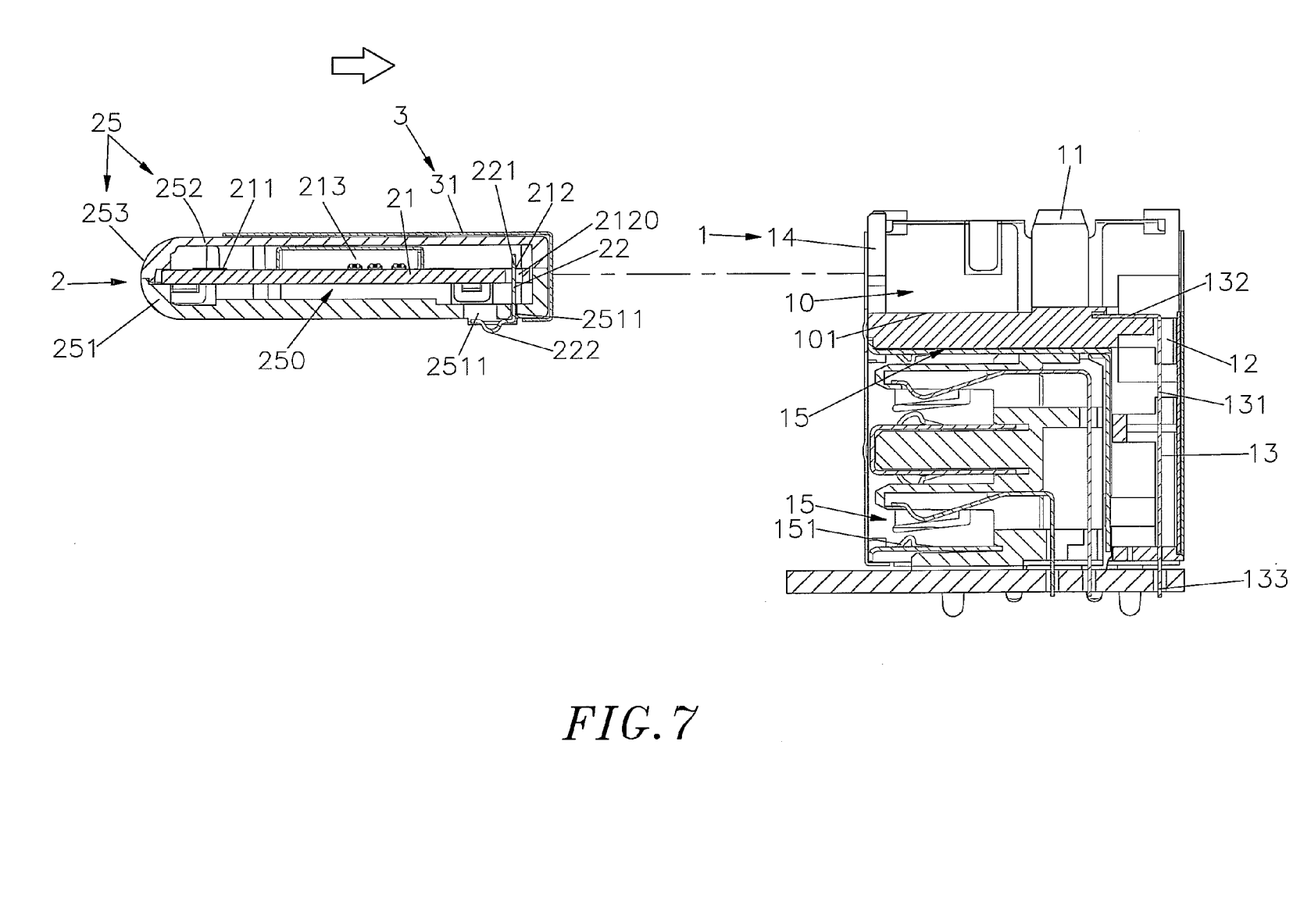
FIG. 7 is a schematic sectional installation view of the present invention, illustrating installation of the transmission module in the accommodation chamber of the electrically insulative housing in a horizontal direction.
Figure 8:
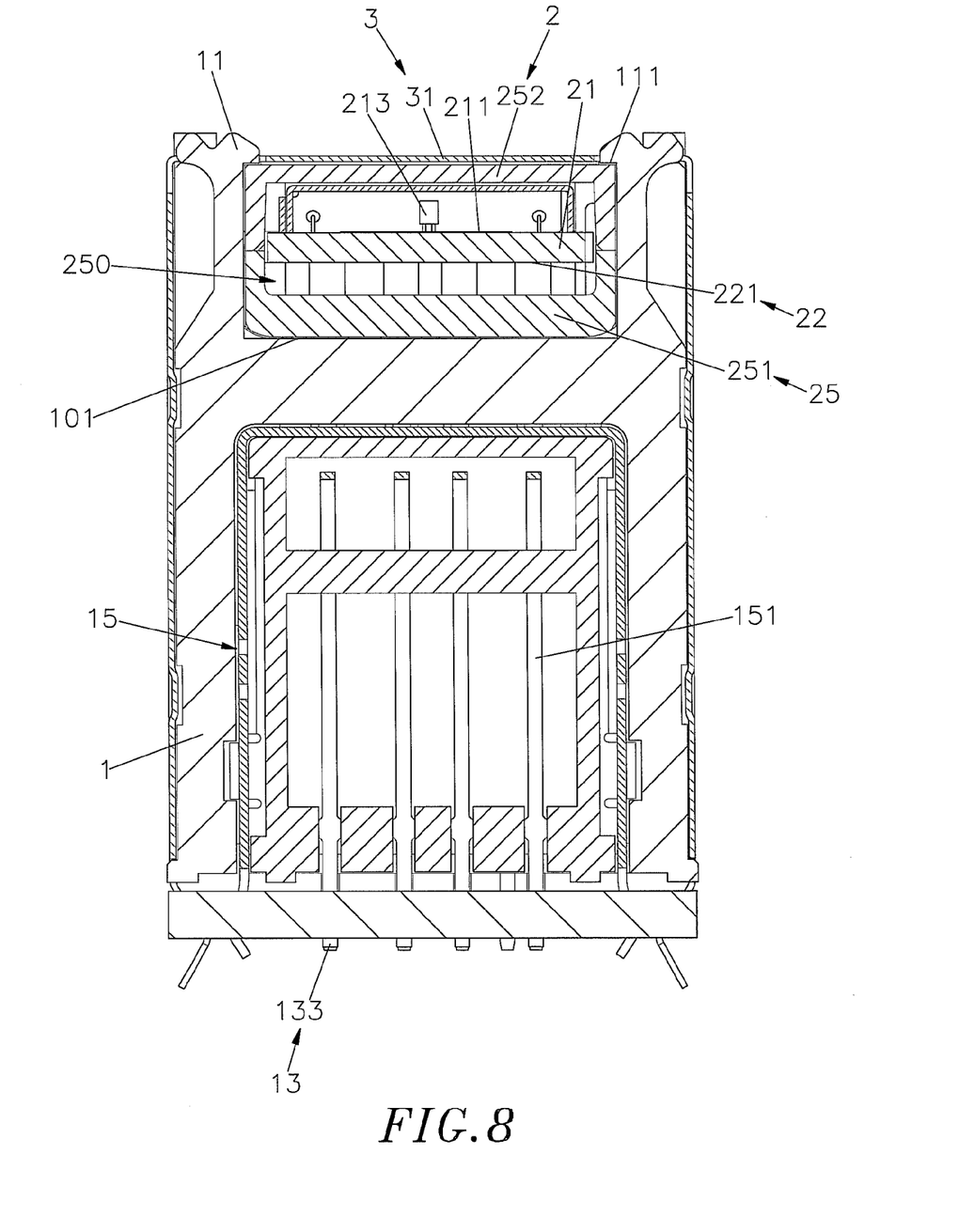
FIG. 8 is a sectional front view of the wireless transmission apparatus in accordance with the present invention.

Referring to FIGS. 5~8 and FIGS. 2 and 4 again, as stated above, the transmission module 2 is inserted into the accommodation chamber 10 vertically from the top side of the electrically insulative housing 1 or horizontally from the front side of the electrically insulative housing 1. Further, after bonding of the bonding ends 221 of the metal adapter terminals 22 to the respective via holes 2120 of the bonding unit 212 of the circuit assembly 21 and insertion of the transmission module 2 into the accommodation chamber 10 of the electrically insulative housing 1, the springy contact ends 222 of the metal adapter terminals 22 of the transmission module 2 are respectively kept in positive contact with the front contact portions 132 of the metal conducting terminals 13 at the bottom wall 101 of the accommodation chamber 10 without a further soldering process. At this time, the top hooked portions 111 of the springy retaining arms 11 are respectively hooked in the retaining grooves 24 of the transmission module 2 to prohibit the transmission module 2 from vertical displacement, and the retaining blocks 14 of the electrically insulative housing 1 are respectively forced into engagement with the respective locating grooves 23 of the transmission module 2 to prohibit the transmission module 2 from horizontal displacement. Thus, the transmission module 2 is firmly secured in position in the accommodation chamber 10 of the electrically insulative housing 1 for application.

Further, electrical connectors 151 are respectively installed in the respective receiving holes 15. Thus, the electrical connectors 151 and the transmission module 2 are arranged in a stack, saving the space. Thus, no any extra wired signal or wireless signal converting circuit is necessary. Thus, the wireless transmission apparatus can be installed in an external circuit board without interfering with its circuit layout, and can also transmit a wired signal through the electrical connectors 151 and a wireless signal (for example, Bluetooth or Wi-Fi signal) through the transmission module 2, i.e., the wireless transmission apparatus is practical for multiple signal transmission applications.

As stated above, the invention provides a wireless transmission apparatus including an electrically insulative housing 1, which comprises an accommodation chamber 10, springy retaining arms 11 and retaining blocks 14 respectively and symmetrically disposed at two opposite lateral sides of the accommodation chamber 10, a plurality of metal conducting terminals 13 arranged at the rear side of the electrically insulative housing 1 with respective front contact portions 132 thereof respectively horizontally extended to the bottom wall 101 of the accommodation chamber 10, and a transmission module 2, which comprises a box 25, which is accommodated in the accommodation chamber 10 and comprises a plurality of locating grooves 23 respectively forced into engagement with the retaining blocks 14 of the electrically insulative housing 1 and a plurality of retaining grooves 24 respectively forced into engagement with top hooked portions 111 of the springy retaining arms 11, a circuit assembly 21 mounted in the box 25, and a plurality of metal adapter terminals 22 each having a bonding end 221 respectively bonded to a bonding unit 212 of the circuit assembly 21 and a respective springy contact end 222 respectively kept in positive contact with the front contact portion 132 of one respective metal conducting terminal 13.

In conclusion, the wireless transmission apparatus of the present invention has the features and advantages as follows:
1. The accommodation chamber 10 of the electrically insulative housing 1 allows installation of the transmission module 2 vertically from its top side or horizontally front its front side, and the springy contact ends 222 of the metal adapter terminals 22 of the transmission module 2 are respectively kept in positive contact with the front contact portions 132 of the respective metal conducting terminal 13 at the bottom wall 101 of the accommodation chamber 10 after installation of the transmission module 2 in the accommodation chamber 10.
2. Electrical connectors 151 are respectively installed in the respective receiving holes 15 at different elevations below the transmission module 2 in the accommodation chamber 10 of the electrically insulative housing 1, saving much space.
3. By means of the electrical connectors 151 and the transmission module 2, the wireless transmission apparatus can be installed in an external circuit board without interfering with its circuit layout, and can transmit a wired signal as well as a wireless signal without an extra signal converting circuit.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A wireless transmission apparatus, comprising:
an electrically insulative housing comprising an accommodation chamber;
a plurality of metal conducting terminals arranged at a rear side of said electrically insulative housing, each said metal conducting terminal comprising a front contact portion horizontally extended to the inside of said accommodation chamber and rested on a bottom wall of said accommodation chamber; and
a transmission module accommodated in said accommodation chamber, said transmission module comprising a circuit assembly adapted for transmitting a wireless signal and a plurality of metal adapter terminals electrically connected to said circuit assembly, each said metal adapter terminal comprising a springy contact end respectively kept in positive contact with the front contact portion of one said metal conducting terminal.

2. The wireless transmission apparatus as claimed in claim 1, wherein said accommodation chamber is a substantially U-shaped open chamber; said electrically insulative housing comprises a plurality of terminal grooves vertically arranged at a rear side thereof in a parallel manner and extending perpendicular to the bottom wall of said accommodation chamber for accommodating said metal conducting terminals.

3. The wireless transmission apparatus as claimed in claim 2, wherein each said metal conducting terminal comprises a base portion positioned in one said terminal groove of said electrically insulative housing and a rear bonding portion extended from one end of said base portion and suspending outside said terminal grooves for bonding; the front contact portion of each said metal conducting terminal extends from an opposite end of the base portion of the respective metal conducting terminal at right angles and rested on the bottom wall of said accommodation chamber.

4. The wireless transmission apparatus as claimed in claim 1, wherein said electrically insulative housing comprises a plurality of springy retaining arms symmetrically disposed at two opposite lateral sides relative to said accommodation chamber; said transmission module comprises a plurality of retaining grooves symmetrically disposed at two opposite lateral sides thereof and respectively formed into engagement with said springy retaining arms of said electrically insulative housing.

5. The wireless transmission apparatus as claimed in claim 1, wherein said electrically insulative housing comprises a plurality of retaining blocks symmetrically disposed at two opposite lateral sides relative to said accommodation chamber and carries a signal transmitting and receiving member at a front side thereof adjacent to said retaining blocks; said transmission module comprises a plurality of locating grooves symmetrically disposed at two opposite lateral sides thereof and respectively formed into engagement with said retaining blocks of said electrically insulative housing.

6. The wireless transmission apparatus as claimed in claim 1, further comprising a metal shield surrounding said electrically insulative housing, said metal shield comprising a substantially U-shaped body shielding shell and a cover shielding shell covering said substantially U-shaped body shielding shell.

7. The wireless transmission apparatus as claimed in claim 1, wherein said transmission module is configured subject to one of Bluetooth technology and Wi-Fi technology, comprising a box defining therein a receiving chamber, and a circuit assembly accommodated in said receiving chamber, said circuit assembly comprising a plurality of via holes for the bonding of said metal conducting terminals.

8. The wireless transmission apparatus as claimed in claim 7, wherein said box of said transmission module comprises a box body and a box cover covering said box body; said box body comprises a plurality of through holes cut through opposing top and bottom walls of said box body for the passing of said metal conducting terminals.

9. The wireless transmission apparatus as claimed in claim 1, wherein said circuit assembly of said transmission module comprises a bonding unit disposed near a rear side thereof, said bonding unit comprising a plurality of via holes; each said metal adapter terminal comprises a bonding end disposed at one end thereof and bonded to one said via hole; the springy contact end of each said metal adapter terminal is curved and extending in a direction perpendicular to the associating bonding end.

10. The wireless transmission apparatus as claimed in claim 1, wherein said circuit assembly comprises a signal transmission unit disposed at one end thereof remote and adapted for receiving a wireless signal, a bonding unit disposed at an opposite end thereof and bonded with said metal adapter terminals, and a signal processing unit electrically connected between said signal transmission unit and said bonding unit.

11. The wireless transmission apparatus as claimed in claim 1, wherein each said metal adapter terminal comprises a bonding end vertically disposed at one end thereof and electrically bonded to said circuit assembly; the springy contact end of each said metal adapter terminal is curved from the associating bonding end of the respective metal adapter terminal and extending in horizontal.

12. The wireless transmission apparatus as claimed in claim 1, wherein the springy contact end of each said metal adapter terminal is suspending at a bottom side of said circuit assembly and extending in horizontal for contacting the front contact portion of one respective said metal conducting terminal.

* * * * *